(12) United States Patent
Schreter

(10) Patent No.: US 8,171,229 B2
(45) Date of Patent: May 1, 2012

(54) WAIT-FREE PARALLEL DATA CACHE

(75) Inventor: Ivan Schreter, Malsch (DE)

(73) Assignee: Sap AG, Walldorf (DE)

(*) Notice: Subject to any disclaimer, the term of this patent is extended or adjusted under 35 U.S.C. 154(b) by 0 days.

(21) Appl. No.: 12/897,679

(22) Filed: Oct. 4, 2010

(65) Prior Publication Data

US 2011/0022805 A1    Jan. 27, 2011

Related U.S. Application Data

(62) Division of application No. 11/784,831, filed on Apr. 9, 2007, now Pat. No. 7,809,891.

(51) Int. Cl.
*G06F 12/00* (2006.01)
(52) U.S. Cl. ................... 711/136; 711/E12.071
(58) Field of Classification Search .......... None
See application file for complete search history.

(56) References Cited

PUBLICATIONS

Sheth, A., and Gopinath, K., "Data Structure Distribution and Multi-threading of Linux File System for Multiprocessors," 5$^{th}$ International Conference on High Performance Computing, 1998, pp. 97-104, IEEE.*
Gilmore, Stephen, "Extending Camelot with Mutable State and Concurrency," Lecture Notes in Computer Science, 2004, vol. 3038, pp. 306-313, SpringerLink.*

* cited by examiner

*Primary Examiner* — Edward Dudek, Jr.
*Assistant Examiner* — John P Fishburn
(74) *Attorney, Agent, or Firm* — Mintz Levin Cohn Ferris Glovsky and Popeo, P.C.

(57) ABSTRACT

A system and method for managing a data cache in a central processing unit (CPU) of a database system. A method executed by a system includes the processing steps of adding an ID of a page p into a page holder queue of the data cache, executing a memory barrier store-load operation on the CPU, and looking-up page p in the data cache based on the ID of the page p in the page holder queue. The method further includes the steps of, if page p is found, accessing the page p from the data cache, and adding the ID of the page p into a least-recently-used queue.

12 Claims, 7 Drawing Sheets

WAIT-FREE PARALLEL DATA CACHE

CROSS REFERENCE TO RELATED APPLICATIONS

This patent application is a divisional of U.S. patent application Ser. No. 11/784,831, filed on Apr. 9, 2007, now U.S. Pat. No. 7,809,891 entitled "WAIT-FREE PARALLEL DATA CACHE", which the disclosure of which is incorporated herein by reference.

BACKGROUND

This disclosure relates generally to computer-based mechanisms for data cache management, and more particularly to techniques to improve read or write access for global data cache structures, and manage expiring data pages and data cache free space.

Various database systems use in-memory cache to speed up access to data. There are various well-known cache management and data replacement techniques, such as Least Recently Used (LRU), a rule by which a page is selected to be removed if it has been used less recently than any other page. Most of, if not all, caching implementations for multi-processor systems need to synchronize on some central lock in order to access a page or resource. This causes significant stalls in data processing on multi-processor systems, as synchronization on global locks is very costly there (on the order of hundreds to thousands of CPU cycles).

FIG. 1 illustrates an exemplary data structure 100 for a data processing system. For each central processing unit (CPU) in the data processing system, there is a dedicated data structure for CPU state 102. Each CPU state 102 is associated with several queues 104, which hold page usage information, free "buckets" of memory for memory allocations, and currently-held pages for reading or writing.

Tasks (T1, T2, . . . ) 108 on each CPU access these CPU state 102 data structures to reserve access to data cache 101. Since tasks 108 are assigned to a CPU, any operations on the CPU state 102 and associated queues 106 do not need to be synchronized between tasks on the CPU 102. No task 108 accesses the CPU state 102 of another CPU.

In addition to CPU-specific state 102, a number of global structures represent the data cache 101 itself, and includes the actual data cache buckets containing database pages, LRU queue, data cache control blocks and hash table, global locks, etc. All tasks 108 need to access these global structures. There are at least two global locks. An LRU global lock 112 protects the LRU queue, while a free list global clock 114 protects the list for free cache buckets.

In operation, an LRU process needs two global variables with pointers to the LRU head and the LRU tail of the LRU queue, to be able to quickly access both ends of the LRU queue. The LRU head is used to chain in recently used buckets; the LRU tail is used to quickly find buckets that have been unused for a predetermined time and which are candidates for expiration. As the data cache 101 becomes full, an expirer process 110 expires old buckets and frees up the memory for new pages which are loaded from another source, e.g., from secondary storage.

Read Access

A given page p must be present in the cache for providing read access to it. If not, it has to be loaded from secondary storage. Furthermore, it must be ensured that page p will not be expired from cache as long as it is accessed. The conventional method to providing read access includes locking the LRU queue to prevent expires, and finding page p in the cache. If page p is not found, the LRU queue is unlocked to allow parallel processes to continue, page p is loaded from secondary storage, the LRU queue is locked again and page p is put to the head. After this, page p can be marked as used for reading. The LRU queue can then be unlocked, the data access performed, the LRU queue is relocked, page p is marked as unused and moved to the head of LRU, and the LRU unlocked again.

The expirer process 110 typically ignores pages that are in use when expiring pages from the LRU tail of the LRU queue. In general, this requires locking the global LRU lock and freelist lock, which is a big contention point. There are various "tricks" to limit the impact of this global lock, such as, for example, using several LRU queues hashed by page ID, but it is not possible to remove the contention using conventional algorithms. Also, such solutions usually worsen the cache efficiency. For instance, in situations where there exist several independent LRU queues, in the worst case there is significant I/O overhead. Further, to mark page used for reading, conventional algorithms usually also do a shared lock on the page, which again adds contention.

Write Access

In conventional methods, a page is locked exclusively for write and shared for read, i.e., all readers are excluded when a writer tries to write the page and the writer is excluded when any reader runs. Access to the page happens similar to read access.

Expiring Data Pages

In case the data cache is full, it is necessary to remove or expire some least-used pages from the cache, based on LRU policy. For this purposes, the expirer process 110 will be triggered. The expirer process 110 itself is usually a singleton, i.e., there may not be several expirer processes running in parallel. The expirer process 110 is adapted to remove some data cache buckets and make them free for reuse.

In a conventional method for expiring data pages, the expirer process 110 locks LRU queue (global lock), picks one or more unused pages from an LRU tail, unchains selected pages from the LRU queue, unlocks the LRU queue, and writes any modified unchained pages to secondary storage. Then, the free list is locked, unchained pages are added to the free list, and the free list is unlocked.

As can be understood, a contention exists for the LRU queue lock. Also, a second contention exists for free list lock. These two contention points are not too problematic however, as the expirer process seldom runs in comparison to cache access. But this is not a complete solution, as care must be taken to prevent writes to pages in I/O and to re-chain used pages back to LRU if those pages were used during writing.

Free Space Management

Unused pages are usually held in one of a number of types of free lists. For example, on startup, all pages are free. Or, when a page gets deleted or expired from cache, it becomes free. Free pages are then used when loading a page from secondary storage, or when creating a completely new page. In conventional methods, free list access needs to be synchronized using a global lock, which also causes contention.

Therefore, an improved data cache management scheme is needed.

SUMMARY

In general, this document discusses a system and method for data cache management which makes use of memory barriers and atomic compare-and-exchange instruction to provide wait-free data cache operations. In addition to database caches, the system and method can be implemented for other types of caches such as file system cache, memory management systems, etc.

In one aspect, a method for managing a data cache in a central processing unit (CPU) of a database system includes the steps of adding an ID of a page p into a page holder queue of the data cache, executing a memory barrier store-load operation on the CPU, and looking-up page p in the data cache based on the ID of the page p in the page holder queue. The method further includes the steps of, if page p is found, accessing the page p from the data cache, and adding the ID of the page p into a least-recently-used queue.

In another aspect, a method for managing a data cache in a central processing unit (CPU) of a database system includes the steps of locking a least-recently-used (LRU) queue of the data cache, selecting a number of pages from the LRU queue, marking a set of the selected number of pages with an expiration flag, and loading a list of used pages from the selected number of pages that have been marked for expiration. The method further includes the step of, for each page p in the selected number of pages, removing the expiration flag if the page p is contained in the list of used pages and removing this page from a list of the selected number of pages.

In yet another aspect, a method is presented for managing free space in a data cache in a central processing unit (CPU) of a database system, in which unused pages are represented in a local free bucket queue. The method includes the steps of defining a local free bucket queue, and determining whether a size of the free bucket queue is more or less than respective overflow and underflow thresholds set for the free bucket queue during freeing or allocating pages. The method further includes the step of, if the size of the free bucket queue is more than the overflow threshold, and in case a global free list queue can be locked, flushing half of the unused page(s) into the global free list queue, and if the size of the free bucket queue is less than the underflow threshold, obtaining unused page(s) from the global free list.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for data cache management using memory barriers and atomic compare-and-exchange instructions to provide wait-free data cache operations. A memory barrier causes the CPU to finish all operations of a first specified type before doing any operation of a second specified type. For example, a specification of "memory barrier store-load" would mean, next memory load instruction after memory barrier may be executed only after all store instructions preceding memory barrier have completed. Memory barriers are needed on multi-processor systems to properly synchronize access to data from processes residing on different CPUs.

The term "compare-and-exchange mem, expected, newvalue, returns oldvalue" refers to an atomic instruction which compares memory location at mem with expected. If the value matches, newvalue will be written to the memory location. In any case, the old value at mem will be returned to oldvalue. Using this instruction, it's possible to construct synchronization primitives, such as spinlocks. Usually, this instruction executes the memory barrier implicitly. It is also possible to use this instruction for programming various wait-free algorithms (for instance, a concurrent stack can be implemented using this method). The methods and systems described below illustrate how to provide safe wait-free access to global data cache structures.

Read Access

In exemplary embodiments of a data cache management system, the locks are to be avoided as much as possible. To accomplish this, the data cache management system makes use of memory barriers and page holder queues.

Figure 2:
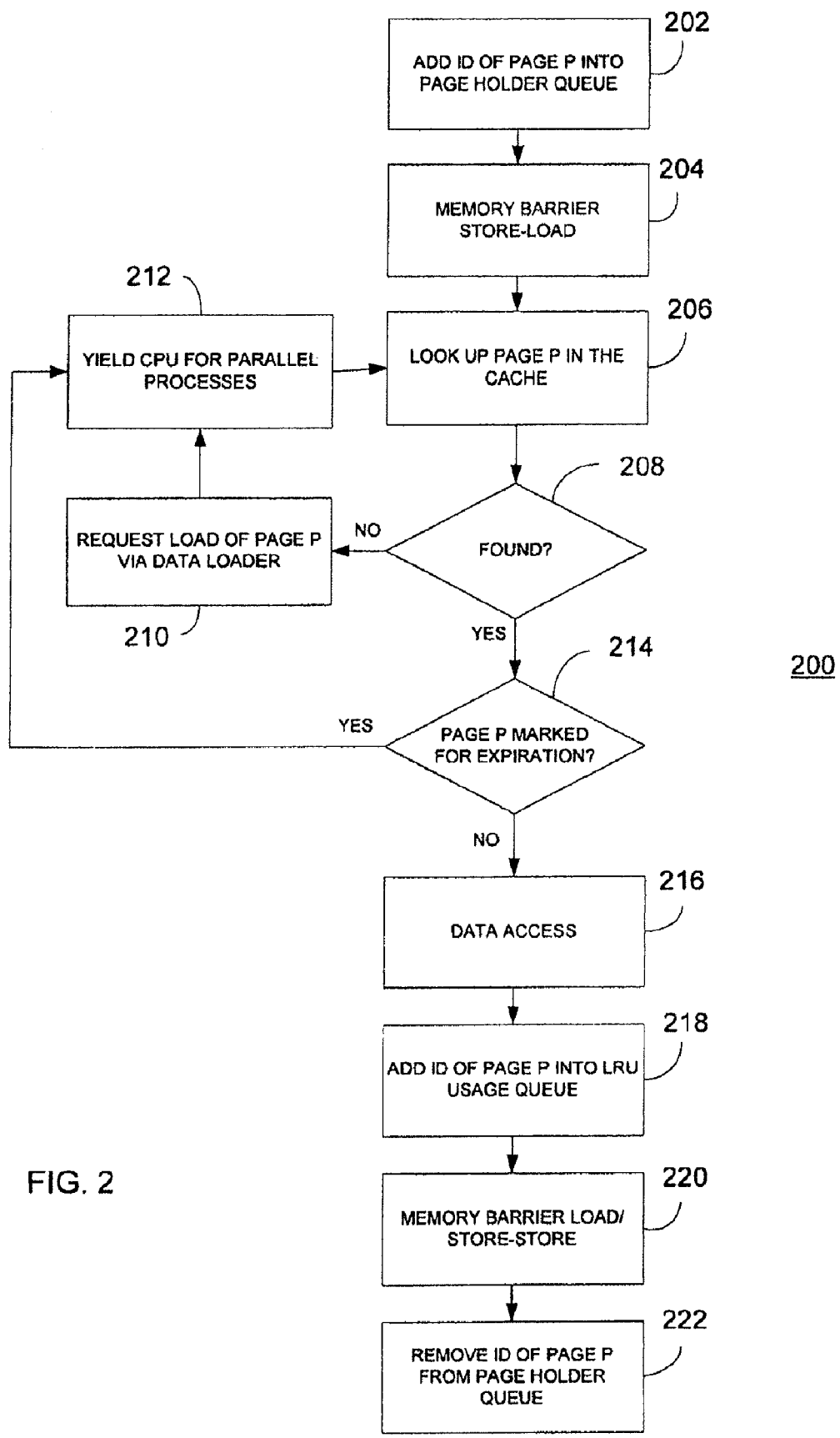
FIG. 2 illustrates a method for performing read access on a data cache.

In accordance with one aspect of the data cache management system, a method 200 for performing read access on a data cache is illustrated in a flowchart in FIG. 2. At 202, an ID of page p is added into a page holder queue. At 204, a memory barrier store-load operation is executed. At 206, page p is looked up in the cache.

At 208, it is determined whether page p is found. If not, at 210 a request to load page p is executed via a data loader, and at 212 the associated CPU is yielded for parallel processes, or else it waits until the load request is complete. The lookup for page p is then retried at 206. Once page p is found, it is determined whether page p is marked for expiration. If so, 212 is executed where the associated CPU is yielded for parallel processes, or else waits until the load request is complete. The lookup for page p is then retried at 206.

If found page p is not marked for expiration, at 216 data access is performed. At 218, the ID of page p is added into the associated LRU usage queue, which is eventually flushed as described in greater detail below. At 220, a memory barrier load/store-store is performed, and at 222 the ID of page p is removed from the associated page holder queue.

In this case, the page holder queues on all CPUs contain a list of all pages currently used, and which may not be expired. This will be used by the expirer process 110 to ignore pages in use. Also, appropriate memory barriers are needed for proper synchronization of data access from the expirer process 110, as described later. Different memory barriers may be needed for various implementations of the page holder queue.

In some implementations, the page holder queue is implemented as a vector. Adding to a queue requires writing a new item at the end of the queue, and incrementing a count of items afterwards, with proper store-store memory barrier in between. Removing from the queue requires copying the last element of the queue to the element to be removed, and then decrementing the count of items afterwards, with proper store-store memory barrier in between.

A problem of reorganizing the LRU usage queue remains. In some implementations, the LRU usage queue would grow infinitely, which is unacceptable. To prevent this, a threshold can be configured (e.g., half of the size of LRU usage queue), such that when adding to the LRU usage queue, this threshold is checked. If the queue size is above threshold, the process will try to lock the LRU. The lock will be usually acquired (i.e. Compare-and-exchange LRU lock, 0, CPUID returns 0).

If the LRU could be locked, LRU changes can be flushed by moving all pages identified by the associated CPU's LRU usage queue to the head of the global LRU, and a memory barrier store-store operation executed. Then, the LRU can be unlocked (i.e. the LRU lock set to 0). Otherwise, if LRU could not be locked, if the LRU usage queue is full, the associated CPU can be yielded for parallel process (or until the LRU lock is free), then the operation can be retried. Otherwise, if some space in LRU usage queue still remains, the method would simply continue. Thus, if the global lock cannot be acquired immediately using atomic instruction, the algorithm will not wait. Only if the CPU's LRU usage queue is full will there be a wait for the LRU lock.

Write Access

It is not possible to completely avoid contention on write operations, as is the case on read operations, because two writers may try to update the same page. However, the contentions are limited to a cache page level, and thus the probability of stalls is much lower. Further, instead of locking using conventional methods, one can use compare-and-exchange instruction to be able to immediately yield control to other tasks on same CPU in case of an unsuccessful lock.

Acquiring the page for write access is much like as for read access, and only the data access is different. In general, there are two possibilities for write data access: 1) in-place write ("dirty write"); and 2) copy-on-write. The in-place write can be used in connection with readers that can cope with "dirty" data and retry the operation, if necessary. For instance, structures of fixed length, such as mapping tables, may be updated using in-place write. But, many database algorithms can also be adjusted to work with in-place write and do any necessary retries.

Copy-on-write does not destroy page data, but rather writes to a copy of the page. In this case, readers always operate on a clean version of the page. The writer will become a new page for writing, with the same page ID and copy of the page (known as a "shadow page"). Thus, the page will be present in two or more versions in memory. The hash entry, however, always points to the newest version, after the writer is finished writing it. Using this mechanism, reading is non-blocking and consistent with respect to writers.

As page access stores a page ID of the read page to a page holder queue, this might prevent old page versions from expiring from the LRU tail, as long as the page is used by some task, even if it is a new version. One solution includes storing bucket IDs in a page holder queue instead of simply storing page IDs.

Expiring Data Pages

Figure 1:
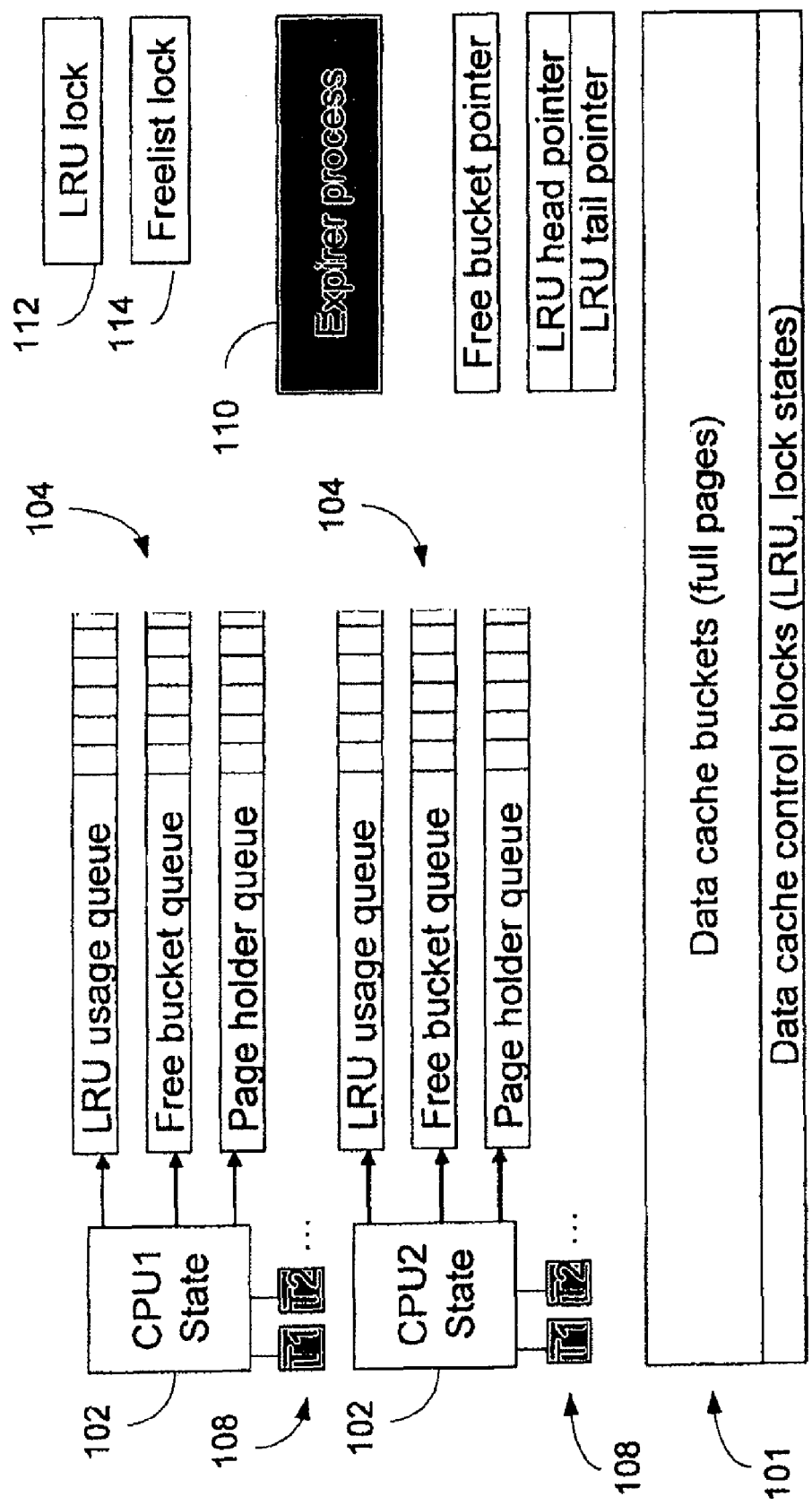
FIG. 1 illustrates an exemplary data structure.
Figure 3:
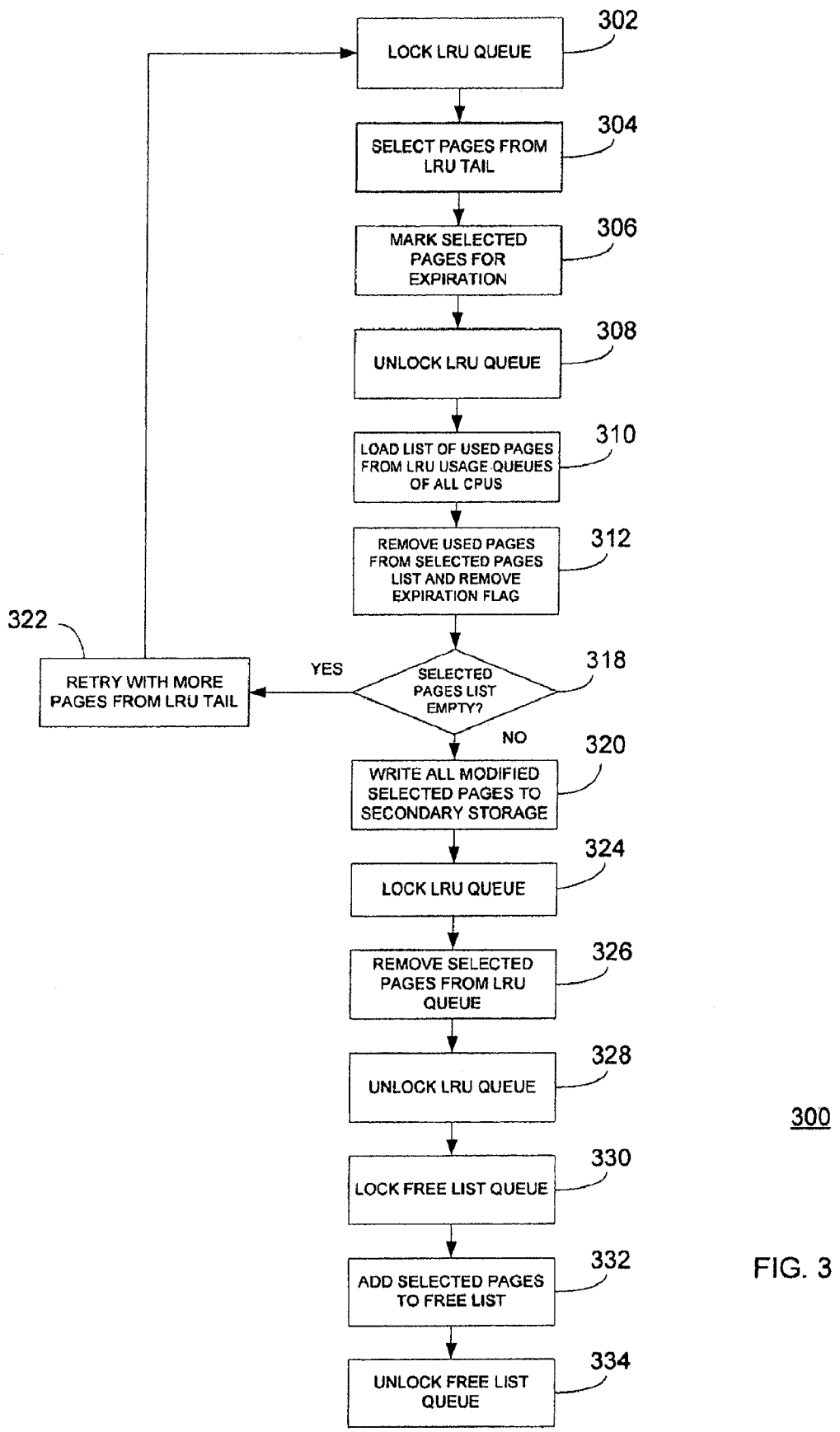
FIG. 3 illustrates a method for expiring pages.

With reference to FIG. 1 and FIG. 3, the expirer process 110 in a wait-free implementation operates in a similar manner as in conventional algorithms. However, the method of picking pages to expire is different. As illustrated in FIG. 3, the method 300 begins at 302, where the LRU queue is locked, causing a global lock. At 304, several pages from the LRU tail are selected. At 306, selected pages are marked for expiration. At 308, the LRU queue is unlocked, and at 310 a list of used pages from the LRU usage queue of all CPUs is loaded.

For each selected page p, at 312 the system determines whether p is contained in used pages list. If p is contained in used pages, the expiration flag on that page p is removed, and that page p is removed from the selected pages list. At 318, the system determines whether the list of selected pages is empty.

If yes, at 322 the step of selecting pages from the LRU tail is retried, yet with more pages. If no, then, at 320, each modified page p contained in the selected pages list is written to secondary storage, at 324 the LRU queue is locked again, and at 326 selected pages are removed from the LRU queue. At 328, the LRU queue is unlocked. At 330, the free list queue is locked, and at 332 selected pages are added to the free list. Finally, at 334, the free list queue is unlocked.

Although the method 300 may seem complex with higher contention, this is not the case. Even if the LRU is locked twice, the LRU lock is held extremely shortly by other threads (few tens of instructions) and the other threads may in most cases continue without locking the LRU lock. Accordingly, the LRU lock can be safely implemented using a spinlock based on compare-and-exchange atomic instruction. Additional complexity of collecting used pages and comparing selected pages list with used pages array ($<=O(n \log n)$, where n is small) is more than outweighed by lower contention on the LRU lock.

Free Space Management

In a wait-free implementation, each CPU keeps a few data pages in a CPU-specific free bucket queue. This queue has a certain maximum size and two thresholds—underflow and overflow. Handling of the queue is similar to handling of the LRU usage queue.

Figure 4:
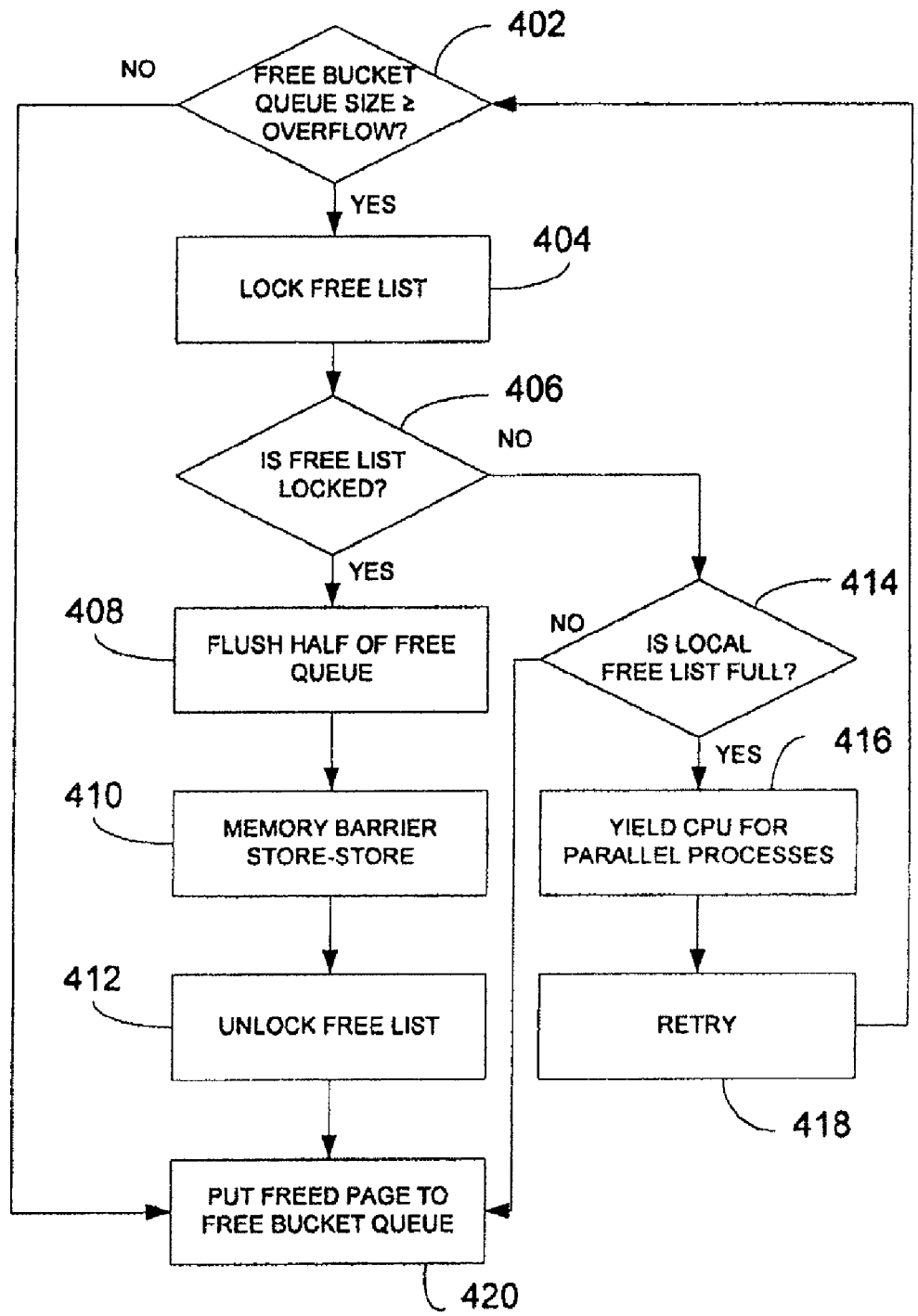
FIG. 4 is a flowchart of a free space management process for freeing a page.

FIG. 4 illustrates a method 400 of freeing a page, in which the system first determines, at 402, whether the free bucket size is equal to or greater than the overflow data. If so, at 404 the system attempts to lock the global free list (compare-and-exchange free list lock, 0, CPUID returns 0). Next, the system determines whether the free list is locked at 406. If so, at 408, half of the free queue is flushed, by adding free pages to the global free queue, and at 410 memory barrier store-store is executed. At 412, the free list is unlocked, i.e. the free list lock is set to 0).

If the free list is not locked at 406, at 414 the system determines whether the local free list queue is full. If so, at 416 the CPU is yielded for parallel processes, and at 418 the system retries at 402. Otherwise, the free list queue is ignored and the method continues. If the free bucket queue size is not larger than the overflow, or after the free list is unlocked at 412, the freed page is put into the free bucket queue, at 420.

Freeing pages flushes some pages to the global queue by first trying to gain a free list lock, but if this does not succeed, the system continues with normal operation. As the free list lock is held extremely shortly, even in the case of full free list queue there will be minimal contention and effectively no wait times.

Figure 5:
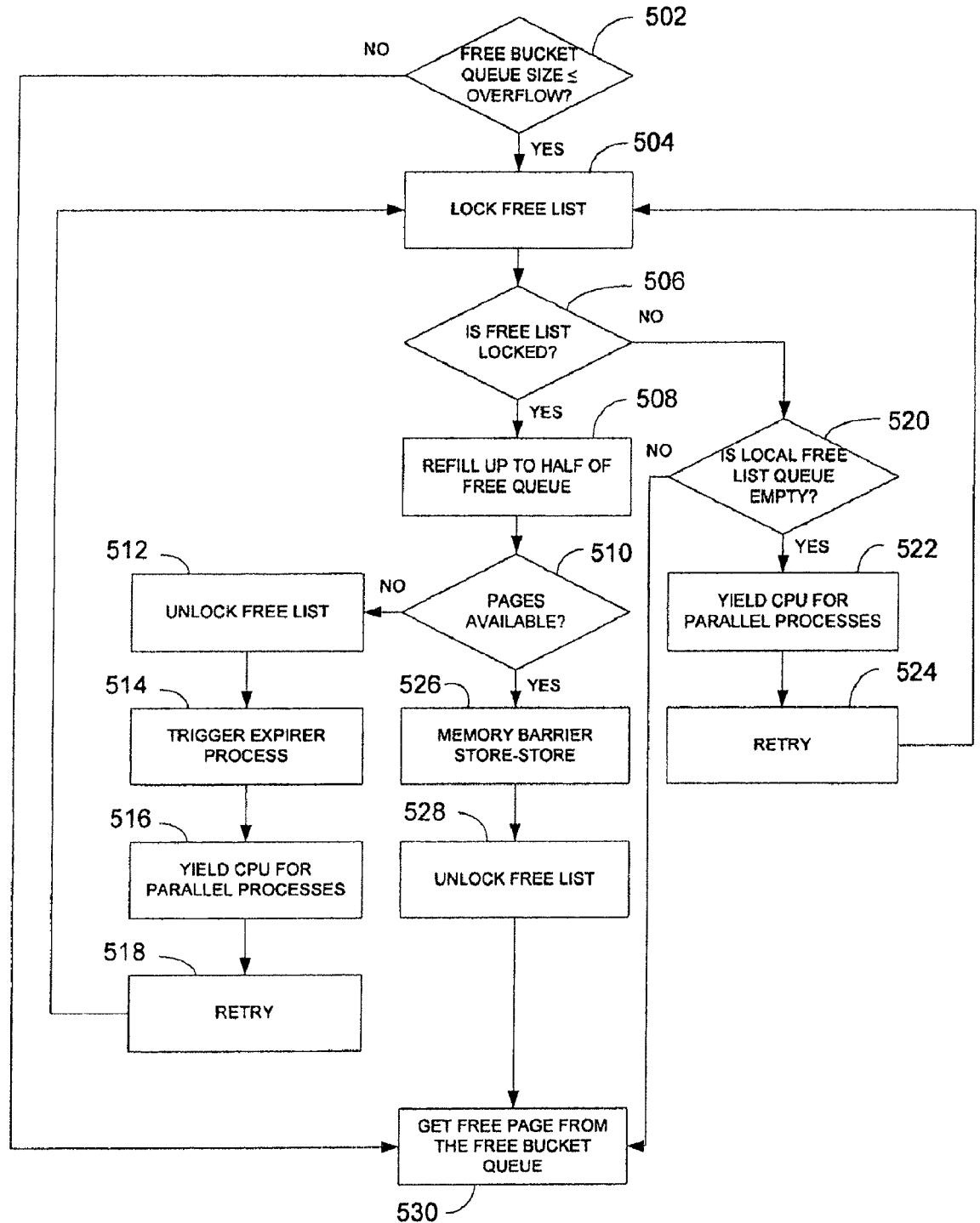
FIG. 5 is a flowchart of a free space management process for allocating a new page.

FIG. 5 is a flowchart of a method 500 for allocating a new page according to a wait-free implementation. At 502, the system determines whether the free bucket queue size is less than or equal to an underflow. If so, at 504 the system attempts to lock the free list (compare-and-exchange free list lock, 0, CPUID returns 0). If the free list is locked, as determined at 506, then at 508 the free queue is filled up to half by transferring free pages from the global free queue. At 510, the system determines whether some pages were available. If not, at 512 the free list is unlocked, at 514 the expirer process is triggered, at 516 the system causes the CPU to yield for parallel processes, and at 518 the system will retry the method 500.

If the free list is not locked at 506, then the system determines whether the local free list queue is empty at 520. If not, step 530 is executed to get the page from local free list. If so, the system causes the CPU to yield for parallel processes, and at 524 the method 500 is retried. If some pages were available at 510, then at 526 memory barrier store-store is executed, and at 528 the free list is unlocked. Finally, the free page is obtained from the now refilled free bucket queue, at 530. Similar to freeing a page, there will be almost no contention in normal case. In a case in which there is no free page, even in the global free list, the expirer process needs to be triggered to free up some pages.

The proposed algorithm has another benefit—cache locality. Since freed and reused pages are mostly used on the same CPU, there is a good chance that the page itself resides in L2 cache in the CPU and thus the operations on newly allocated page do not cause L2 cache line loads (and thus, load on data bus will be lower).

Figure 6:
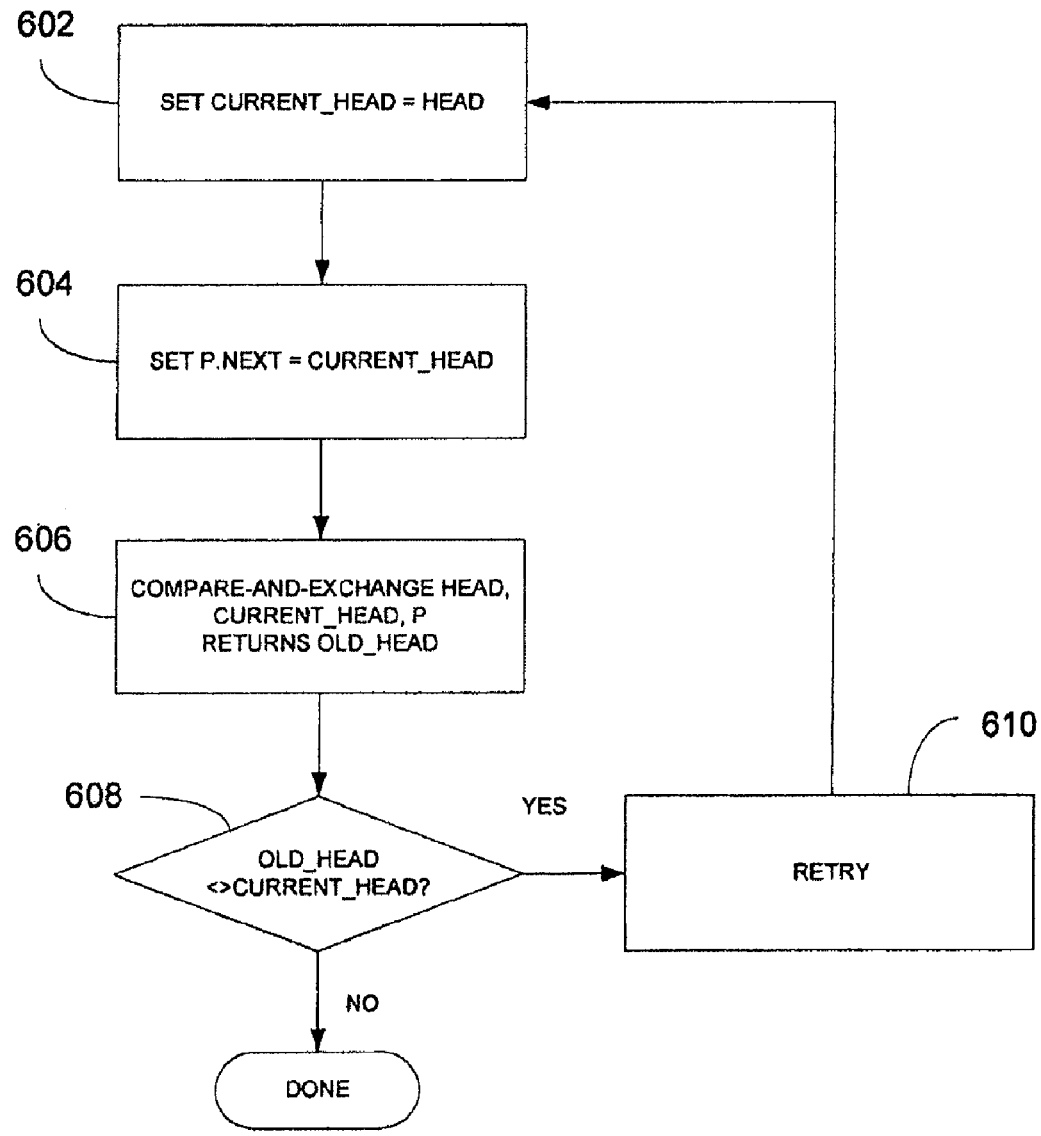
FIG. 6 is a flowchart of a method for adding a page to a free list.

In one alternative, as the global free list is anchored by a single head pointer, it is possible to use a non-locking process for concurrent stack management instead. In this case, a process to manage single pages in free list would occur as follows. FIG. 6 illustrates a method 600 for adding a page p to the free list.

Set current_head=head (602)
Set p.next=current_head (604)
Compare-and-exchange head, current_head, p, returns old_head (606)
If old_head <> current_head: (608), then retry (610), changed by parallel thread. Note that this implementation needs to use a pointer/counter combination instead of simple pointers to avoid ABA problem.

Figure 7:
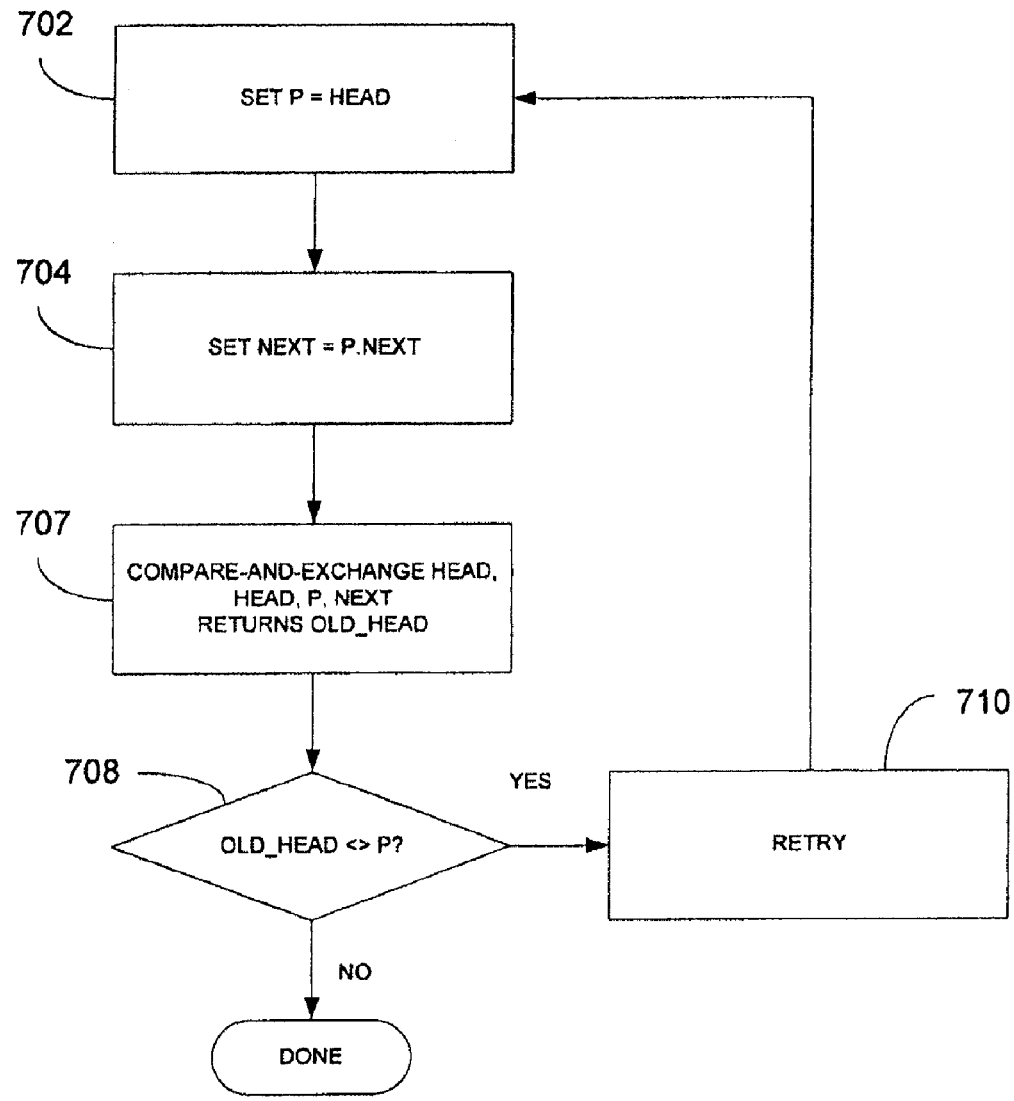
FIG. 7 is a flowchart of a method for obtaining a page from the free list.

FIG. 7 illustrates a method 700 for obtaining a page from the free list:

Set p=head (702)
Set next=p.next (704)
Compare-and-exchange head, p, next, returns old_head (706)
If old_head <> p (708), then retry (710) changed by parallel thread.

In general, configuration and dimensioning of queue sizes depends on data access pattern, CPU architecture (effects of atomic instructions on data bus, instruction pipelining and how much stalls they create), total cache size, number of processors, used data cache management algorithm (e.g., LRU), etc. Proper dimensioning needs to be applied to gain maximum advantage of the wait-free algorithms and to prevent contention on global locks.

Embodiments of the wait free implementation and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results.

What is claimed:

1. A method for managing free space in a data cache in a central processing unit (CPU) of a database system, in which unused pages are represented in a local free bucket queue, the method comprising:
    defining a local free bucket queue;
    determining whether a size of the free bucket queue is one of more than an overflow threshold and less than an underflow threshold, the overflow threshold being set for the free bucket queue during freeing of pages, the underflow threshold being set for the free bucket queue during allocating of pages;
    determining whether a global free list queue is locked by a locking process; and
    if the size of the free bucket queue is more than the overflow threshold and if the global free list queue is locked by the locking process, flushing some of the unused pages from the free bucket queue into the global free list queue, the flushing characterizing the freeing of pages, and
    if the size of the free bucket queue is less than the underflow threshold and if the global free list is locked by the locking process, obtaining, by the free bucket queue, unused pages from the global free list, the obtaining characterizing the allocating of pages.

2. A method in accordance with claim 1, further comprising:
    if the global free list is not locked by the locking process and if the global free list is less than full and when the determined size of the free bucket queue is more than the overflow threshold, putting a free page to the free bucket queue.

3. A method in accordance with claim 1, further comprising:
    if the global free list is not locked by the locking process and if the free bucket queue is full and when the determined size of the free bucket size is more than the overflow threshold, yielding the central processing unit (CPU) for parallel processes and retrying locking the global free list.

4. A method in accordance with claim 1, further comprising:
    if the global free list is not locked by the locking process and if the global free list is not empty and when the determined size of the free bucket queue is less than the underflow threshold, getting a free page from the free bucket queue.

5. A method in accordance with claim 1, further comprising:
    if the global free list is not locked by the locking process and if the free bucket queue is empty and when the determined size of the free bucket size is less than the underflow threshold, yielding the central processing unit (CPU) for parallel processes and retrying locking the global free list.

6. A method in accordance with claim 1, wherein the unused pages include least recently used pages.

7. A method for managing free space in a data cache in a central processing unit (CPU) of a database system, in which unused pages are represented in a local free bucket queue, the method comprising:
    defining a local free bucket queue;
    determining whether a size of the free bucket queue is more than an overflow threshold set for the free bucket queue during freeing of pages;
    determining whether a global free list queue is locked by a locking process; and
    if the size of the free bucket queue is more than the overflow threshold and if the global free list queue is locked by the locking process, flushing some of the unused pages from the free bucket queue into the global free list queue, the flushing characterizing the freeing of pages.

8. A method in accordance with claim 7, further comprising:
    if the global free list is not locked by the locking process and if the global free list is less than full and when the determined size of the free bucket queue is more than the overflow threshold, putting a free page to the free bucket queue.

9. A method in accordance with claim 7, further comprising:
    if the global free list is not locked by the locking process and if the free bucket queue is full and when the determined size of the free bucket size is more than the overflow threshold, yielding the central processing unit (CPU) for parallel processes and retrying locking the global free list.

10. A method for managing free space in a data cache in a central processing unit (CPU) of a database system, in which unused pages are represented in a local free bucket queue, the method comprising:
    defining a local free bucket queue;
    determining whether a size of the free bucket queue is less than an underflow threshold set for the free bucket queue during allocating of pages;
    determining whether a global free list queue is locked by a locking process; and
    if the size of the free bucket queue is less than the underflow threshold and if the global free list is locked by the locking process, obtaining, by the free bucket queue, unused pages from the global free list, the obtaining characterizing the allocating of pages.

11. A method in accordance with claim 10, further comprising:
    if the global free list is not locked by the locking process and if the global free list is not empty and when the determined size of the free bucket queue is less than the underflow threshold, getting a free page from the free bucket queue.

12. A method in accordance with claim 10, further comprising:
    if the global free list is not locked by the locking process and if the free bucket queue is empty and when the determined size of the free bucket size is less than the underflow threshold, yielding the central processing unit (CPU) for parallel processes and retrying locking the global free list.

* * * * *